United States Patent
Ichikawa

(10) Patent No.: US 9,315,672 B2
(45) Date of Patent: Apr. 19, 2016

(54) COLORANT, MICROCAPSULE PIGMENT PREPARED BY USING THE SAME AND INK COMPOSITION FOR WRITING INSTRUMENT

(71) Applicant: MITSUBISHI PENCIL COMPANY, LIMITED, Shinagawa-ku (JP)

(72) Inventor: Shuji Ichikawa, Yokohama (JP)

(73) Assignee: MITSUBISHI PENCIL COMPANY, LIMITED, Tokyo (JP)

(*) Notice: Subject to any disclaimer, the term of this patent is extended or adjusted under 35 U.S.C. 154(b) by 0 days.

(21) Appl. No.: 14/350,842

(22) PCT Filed: Oct. 5, 2012

(86) PCT No.: PCT/JP2012/075914
§ 371 (c)(1),
(2) Date: Apr. 10, 2014

(87) PCT Pub. No.: WO2013/061753
PCT Pub. Date: May 2, 2013

(65) Prior Publication Data
US 2014/0299015 A1 Oct. 9, 2014

(30) Foreign Application Priority Data

Oct. 25, 2011 (JP) ................................. 2011-233694
Jun. 26, 2012 (JP) ................................. 2012-142952

(51) Int. Cl.
C09D 11/17 (2014.01)
C09B 11/24 (2006.01)
C09B 67/02 (2006.01)
C09K 9/02 (2006.01)
C09B 67/08 (2006.01)

(52) U.S. Cl.
CPC ............ *C09B 11/24* (2013.01); *C09B 67/0013* (2013.01); *C09B 67/0097* (2013.01); *C09D 11/17* (2013.01); *C09K 9/02* (2013.01); *C09K 2211/1088* (2013.01)

(58) Field of Classification Search
CPC .... C09D 11/17; C09B 11/24; C09B 67/0013; C09B 67/0097; C09K 9/02; C09K 2211/1088
USPC ............. 106/31.32, 31.43, 31.19, 31.22, 506; 549/227
See application file for complete search history.

(56) References Cited

U.S. PATENT DOCUMENTS

| | | | |
|---|---|---|---|
| 4,390,616 A | 6/1983 | Sato et al. | |
| 4,433,156 A | 2/1984 | Ishige et al. | |
| 4,721,702 A * | 1/1988 | Iwakura et al. | 549/227 |
| 4,727,056 A * | 2/1988 | Sano et al. | 549/227 |
| 4,747,875 A * | 5/1988 | Kawai | C09B 11/26 106/31.21 |
| 4,791,094 A * | 12/1988 | Sano et al. | 503/209 |
| 5,389,489 A * | 2/1995 | Yanagihara et al. | 430/138 |

FOREIGN PATENT DOCUMENTS

| | | | |
|---|---|---|---|
| GB | 1273454 A | 5/1972 | |
| GB | 2098622 A | 11/1982 | |
| JP | 48-8725 | 3/1973 | |
| JP | 48-8725 B1 | 3/1973 | |
| JP | 56-77189 A | 6/1981 | |
| JP | 57-165387 A | 10/1982 | |
| JP | 63-15780 A | 1/1988 | |
| JP | 2001-115153 A | 4/2001 | |
| JP | 2008-045062 A | 2/2008 | |
| JP | 2009-47814 A | 3/2009 | |
| JP | 2010-001339 | 1/2010 | |
| JP | 2011-162791 A | 8/2011 | |
| JP | 2012-246431 A | 12/2012 | |
| WO | WO 2010/064447 A1 | 6/2010 | |

OTHER PUBLICATIONS

English translation of JP 2010/001339; Jan. 2010.*
English translation of JP 2009/047814; Mar. 2009.*
English translation of JP 2011/162791; Aug. 2011.*
English translation of JP 2008/045062; Feb. 2008; 22 pages.*
English translation of JP 2010/132822; Jun. 2010; 28 pages.*

(Continued)

*Primary Examiner* — Helene Klemanski
(74) *Attorney, Agent, or Firm* — Buchanan, Ingersoll & Rooney PC

(57) ABSTRACT

Provided are a colorant represented by the following Formula (I) which is excellent in a color intensity and a lightfastness, a microcapsule pigment including the colorant, a developer and a chromic temperature controller and an ink composition for writing instruments including the microcapsule pigment:

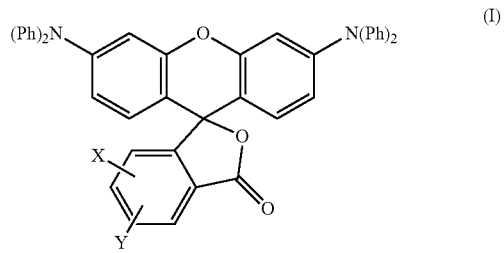

(I)

wherein X and Y represent a hydrogen atom, an alkyl group having 1 to 4 carbon atoms or a halogen atom; and X and Y may be identical or different from each other, provided that a case in which both of X and Y are a hydrogen atom is excluded.

6 Claims, No Drawings

(56) References Cited

OTHER PUBLICATIONS

International Search Report (PCT/ISA/210) mailed on Jan. 8, 2013, by the Japanese Patent Office as the International Searching Authority for International Application No. PCT/JP2012/075914.
Notification of Transmittal of Translation of the International Preliminary Report on Patentability (Form PCT/IB/338 and PCT/IB/373) and the Written Opinion of the International Searching Authority (Form PCT/ISA/237) issued on Apr. 29, 2014, by the International Bureau of WIPO for International Application No. PCT/JP2012/075914., (6 pages).
Extended Search Report issued by the European Patent Office in corresponding European Application No. 12844552 on Jun. 24, 2015 (4 Pages).

* cited by examiner

COLORANT, MICROCAPSULE PIGMENT PREPARED BY USING THE SAME AND INK COMPOSITION FOR WRITING INSTRUMENT

TECHNICAL FIELD

The present invention relates to a colorant, a microcapsule pigment prepared by using the same and an ink composition for writing instruments, and the present invention relates more specifically to a colorant comprising a leuco dye which is excellent in a color intensity and a lightfastness, a thermochromic microcapsule pigment making use of a developing and fading mechanism of the above colorant, and an ink composition for writing instruments containing the above microcapsule pigment.

BACKGROUND ART

In ink compositions for writing instruments prepared by using a thermochromic coloring material making use of a developing and fading mechanism of a leuco dye, a pigment prepared by microcapsulating the above colorant has so far been usually used.

Known are, for example, (a) a specific lactone derivative as an electron-donating coloring-type organic compound, (b) an electron-accepting compound which is a developer and (c) a reversible thermochromic microcapsule pigment including a reaction medium reversibly causing an electron donating and accepting reaction by the both components described above in a specific temperature region (refer to, for example, patent document 1), and azaphthalides are listed as the specific colorant (compound) in the above patent document 1.

However, azaphthalides are not still unsatisfactory in a color intensity and a lightfastness, and a microcapsule pigment and an ink for writing instruments which are prepared by using the same involve the problems that the drawn lines are short of an intensity and that the drawn lines are time-dependently faded in a certain case.

CONVENTIONAL ART DOCUMENTS

Patent Documents

Patent document 1: JP-A 2001-115153 (claims, examples and others)

DISCLOSURE OF THE INVENTION

In light of the problems and the existing situations on the conventional art described above, the present invention intends to solve them, and an object thereof is to provide a colorant comprising a leuco dye which is excellent in a color intensity and a lightfastness, a thermochromic microcapsule pigment which makes use of a developing and fading mechanism of the above colorant and which is excellent in a developing and fading property, and an ink composition for writing instruments containing the above microcapsule pigment.

In light of the problems and the like on the conventional art described above, intense investigations repeated by the present inventors on the conventional problems described above have resulted in finding that a colorant which meets the object described above, a microcapsule pigment prepared by using the same, and an ink composition for writing instruments are obtained by using a specific leuco dye and a microcapsule pigment prepared by using the above dye, and thus they have come to complete the present invention.

That is, the present invention resides in the following items (1) to (4). (1) A colorant comprising a leuco dye represented by the following Formula (I):

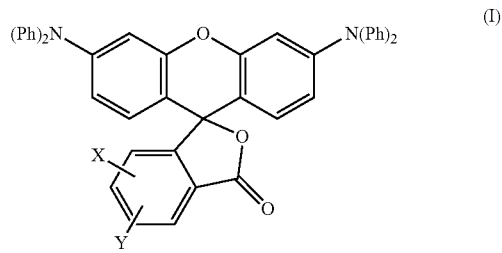

(I)

[in Formula (I) described above, X and Y represent a hydrogen atom, an alkyl group having 1 to 4 carbon atoms or a halogen atom; and X and Y may be identical or different from each other, provided that a case in which both of X and Y are a hydrogen atom is excluded].
(2) The colorant as described in the above item (1), wherein at least one of X and Y is methyl group or a chlorine atom.
(3) A microcapsule pigment comprising at least the colorant as described in the above item (1) or (2), a developer and a chromic temperature controller.
(4) An ink composition for writing instruments comprising the microcapsule pigment as described in the above item (3).

According to the present invention, provided are a colorant comprising a leuco dye which is excellent in a color intensity and a lightfastness, a thermochromic microcapsule pigment which makes use of a developing and fading mechanism of the above colorant and which is excellent in a developing and fading property, and an ink composition for writing instruments containing the above microcapsule pigment.

EMBODIMENT FOR CARRYING OUT THE INVENTION

The embodiment of the present invention shall be explained below in detail.
Colorant:
The colorant of the present invention is characterized by comprising a leuco dye represented by the following Formula (I):

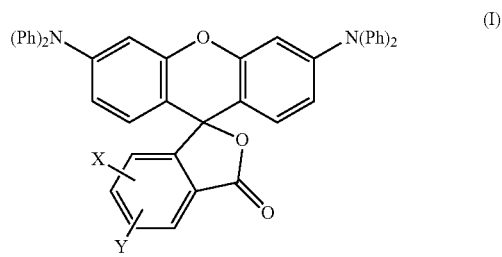

(I)

[in Formula (I) described above, X and Y represent a hydrogen atom, an alkyl group having 1 to 4 carbon atoms or a halogen atom; and X and Y may be identical or different from each other, provided that a case in which both of X and Y are a hydrogen atom is excluded].

The colorant represented by Formula (I) described above is a blue leuco dye which is excellent in a color intensity and a lightfastness and provides a vivid blue color tone.

Azaphthalides shown as the example in patent document 1 are known as a blue leuco dye, and the dye represented by Formula (I) is used in the present invention, whereby obtained is the dye which is more excellent in a color intensity and a lightfastness and which provides a vivid blue color.

In Formula (I) described above, X and Y include a hydrogen atom, an alkyl group having 1 to 4 carbon atoms such as methyl, ethyl, n-propyl, isopropyl, n-butyl, sec-butyl, isobutyl, and tert-butyl group, or a halogen atom such as a fluorine atom (—F), a chlorine atom (—Cl), a bromine atom (—Br) and an iodine atom (—I), and X and Y may be identical or different from each other, provided that a case in which both of X and Y are a hydrogen atom is excluded.

The leuco dye represented by Formula (I) described above includes, for example, methyl-3',6'-bisdiphenylaminofluoran, ethyl-3',6'-bisdiphenylaminofluoran, chloro-3',6'-bisdiphenylaminofluoran, fluoro-3',6'-bisdiphenylaminofluoran, bromo-3',6'-bisdiphenylaminofluoran, iodo-3',6'-bisdiphenylaminofluoran, and 3,4-dichloro-3',6'-bisdiphenylaminofluoran. They can be used alone or in a mixture of two or more kinds thereof. At least one of X and Y is preferably methyl group (—CH$_3$) or a chlorine atom (—Cl) from the viewpoints of the color intensity, the lightfastness, the productivity and the like. Introduction of the groups described above makes it possible to provide the reddish deep hue. They are more preferably a chlorine atom rather than methyl group from the viewpoint of the lightfastness, and both of X and Y are particularly preferably a chlorine atom.

In producing the leuco dye represented by Formula (I) described above, a triarylamine derivative and a phthalic anhydride derivative which are commercially available or obtained by conventional methods are heated and reacted under the presence of an acid catalyst, whereby the leuco dye represented by Formula (I) which is excellent in a color intensity and a lightfastness can readily be obtained.

[Microcapsule Pigment]:

Next, the microcapsule pigment of the present invention includes a thermochromic composition constituted from at least the colorant represented by Formula (I) described above, a developer and a chromic temperature controller.

<Developer>

The developer used is a component having ability to develop the colorant represented by Formula (I). Compounds which have so far been publicly known can be used as the developer and include, for example, inorganic acids, aromatic carboxylic acids and anhydrides therefor or metal salts therefor, sulfonic acids, other organic acids and phenolic compounds, and the like.

The developer is preferably a bisphenol derivative and includes a compound represented by the following Formula (II):

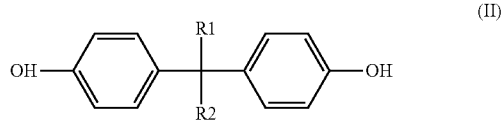

[in Formula (II) described above, R1 represents a hydrogen atom or an alkyl group having 1 to 2 carbon atoms, and R2 represents a linear or branched alkyl group having 4 to 10 carbon atoms].

In addition to the compound described above, sulfonylurea compounds can preferably be used as well.

The compound represented by Formula (II) described above includes, to be specific, at least one (each alone or in a mixture of two or more kinds thereof; hereinafter, the same shall apply) of 4,4'-(2-ethylhexylidene)bisphenol, 4,4'-(2-ethylpentylidene)bisphenol, 4,4'-octylidenebisphenol, 4,4'-hexylidenebisphenol, 4,4'-(4-methyloctylidene)bisphenol, 4,4'-decylidenebisphenol, 4,4'-(1,3-dimethylbutylidene)bisphenol, 4,4'-(3-methylbutylidene)bisphenol, 4,4'-(1-methyl-heptylidene)bisphenol, 4,4'-(1,2-dimethylbutylidene)bisphenol, 4,4'-(1,5-dimethylhexylidene)bisphenol, 4,4'-(1-ethyl-3-methylpentylidene)bisphenol, 4,4'-(1-methyl-4-methylheptylidene)bisphenol, 4,4'-(1-ethyl-hexylidene)bisphenol, 4,4'-(1-ethyl-pentylidene)bisphenol, 4,4'-(1-ethyl-octylidene)bisphenol, and the like. It is a matter of course that it shall not be restricted to the above compounds.

In the present invention, the above developers are used alone or in combination of two or more kinds thereof, or developers which have so far been publicly known are used in combination as far as the various properties of the developers of the present invention are not damaged, whereby the color intensity in developing can freely be controlled. Accordingly, a use amount thereof can optionally be selected according the desired color intensity and shall not specifically be restricted. Usually, the amount is selected suitably in a range of 0.1 to 100 parts by mass based on 1 part by mass of the colorant represented by Formula (I) described above.

<Chromic Temperature Controller>

The chromic temperature controller used in the present invention is a substance for controlling a chromic temperature in coloration of the colorant represented by Formula (I) and the developer.

Compounds which have so far been publicly known can be used as the chromic temperature controller. They include, to be specific, alcohols, esters, ketones, ethers, acid amides, azomethines, fatty acids, and hydrocarbons.

Ester compounds comprising compounds having a hydroxyl group in a chemical structure and saturated fatty acids having 8 to 22 carbon atoms are preferred, for example, ester compounds comprising bisphenol derivatives and saturated fatty acids having 8 to 22 carbon atoms as represented by the following Formula (III) are listed:

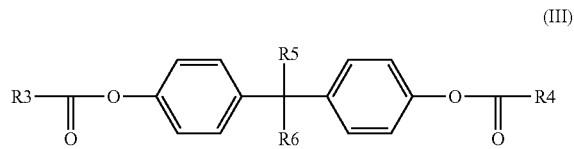

[in Formula (III) described above, R3 and R4 represent a linear or branched alkyl group having 7 to 21 carbon atoms, and R5 and R6 represent a hydrogen atom, an alkyl group having 1 to 2 carbon atoms or CF$_3$].

The compound represented by Formula (III) described above includes, to be specific, at least one of
4,4'-(hexafluoroisopropylidene)bisphenol dicaprate,
4,4'-(hexafluoroisopropylidene)bisphenol dilaurate,
4,4'-(hexafluoroisopropylidene)bisphenol dimyristate,
4,4'-(hexafluoroisopropylidene)bisphenol dipalmitate,
4,4'-(hexafluoroisopropylidene)bisphenol diundecanoate,
4,4'-(hexafluoroisopropylidene)bisphenol ditridecanoate,
4,4'-(isopropylidene)bisphenol dicaprate,
4,4'-(isopropylidene)bisphenol dilaurate,
4,4'-(isopropylidene)bisphenol dimyristate,
4,4'-(isopropylidene)bisphenol dipalmitate,
4,4'-(isopropylidene)bisphenol diundecanoate, 4,4'-(isopropylidene)bisphenol ditridecanoate,
4,4'-methylenebisphenol dicaprate, 4,4'-methylenebisphenol dilaurate, 4,4'-methylenebisphenol dimyristate,
4,4'-methylenebisphenol dipalmitate,
4,4'-methylenebisphenol diundecanoate,
4,4'-methylenebisphenol ditridecanoate, and the like.

A use amount of the above chromic temperature controller can optionally be selected according the desired hysteresis width and the desired color intensity in color development and shall not specifically be restricted. Usually, a chromic temperature controller is used preferably in a range of 1 to 100 parts by mass based on 1 part by mass of the colorant.

Chromic temperature controllers which have so far been publicly known can be used as well in combination as far as the various properties of the composition of the present invention are not damaged.

<Microcapsule Pigment>

The microcapsule pigment used in the present invention can be produced by microcapsulating the thermochromic composition comprising at least the colorant represented by Formula (I) described above, the developer and the chromic temperature controller so that an average particle diameter thereof is controlled to 0.3 to 1.0 µm.

The microcapsulating method includes, for example, an interfacial polymerization method, an interfacial polycondensation method, an in situ polymerization method, an in-liquid curing coating method, a phase separation method from an aqueous solution, a phase separation method from an organic solvent, a melt dispersing cooling method, an air suspending coating method, a spray drying method, and the like, and the method can suitably be selected from the described above according to the uses.

In a case of, for example, the phase separation method from an aqueous solution, the colorant represented by Formula (I) described above, the developer and the chromic temperature controller are molten by heating, and then the mixture is added to an emulsion and dispersed in a form of an oil droplet by heating and stirring; then, a resin source material or the like is used as a capsule filming agent; for example, the respective solutions such as amino resin solutions, to be specific, a methylolmelamine aqueous solution, a urea solution, a benzoguanamine solution and the like are slowly added and continued reaction to prepare a dispersion; and the dispersion is filtrated, whereby the intended thermochromic microcapsule pigment can be produced.

The contents of the colorant, the developer and the chromic temperature controller each described above are varied according to the kinds of the colorant represented by Formula (I), the developer and the chromic temperature controller and the microcapsulating method, and the contents are 0.1 to 100 in terms of a mass ratio based on 1 of the above colorant in a case of the developer and 1 to 100 in a case of the chromic temperature controller. A content of the capsule filming agent is 0.1 to 1 in terms of a mass ratio based on the capsule content.

In the microcapsule pigment of the present invention, a developing temperature and an fading temperature of the blue color can be set to suitable temperatures by suitably combining the kinds and the amounts of the colorant represented by Formula (I) described above, the developer and the chromic temperature controller.

The coated membrane of the microcapsule pigment of the present invention is formed preferably by a urethane resin, an epoxy resin or an amino resin from the viewpoints of further enhancing the drawn line intensity, the storage stability and the writing property. The urethane resin includes, for example, compounds of isocyanates and polyols. The epoxy resin includes, for example, compounds of epoxides and amines. The amino resin is comprised preferably by, for example, a melamine resin, a urea resin, a benzoguanamine resin or the like and more preferably by the melamine resin from the viewpoints of the productivity, the storage stability and the writing property.

A thickness of the coated membrane of the microcapsule pigment is suitably determined according to a toughness of the required coated membrane and the drawn line intensity.

In forming the coated membrane by the amino resin, the suitable amino resin source material (the melamine resin, the urea resin, the benzoguanamine resin or the like), a dispersant, a protective colloid and the like are selected when using the respective microcapsulating methods.

An average particle diameter of the microcapsule pigment used in the present invention is preferably 0.3 to 1.0 µm from the viewpoints of the coloring property, the color developing property, erasability and the stability, and inhibiting adverse influences from being exerted to the writing property. The "average particle diameter" prescribed in the present invention (including examples and others) is a value of an average particle diameter measured by means of a particle size measuring equipment (a particle diameter measuring equipment N4 Plus, manufactured by Beckman Coulter Inc.).

If the above average particle diameter is less than 0.3 µm, the sufficiently high drawn line intensity is not obtained. On the other hand, if it exceeds 1.0 µm, the writing property and a dispersion stability of the microcapsule pigment is deteriorated. Accordingly, both are not preferred.

Though varied according to the microcapsulating methods, the microcapsule pigment falling in the range (0.3 to 1.0 µm) of the average particle diameter described above can be prepared by suitable combination of the stirring conditions in the production steps in a case of the phase separation method from an aqueous solution.

The microcapsule pigment of the present invention thus constituted is excellent in a color intensity and a lightfastness and excellent as well in an erasability and a stability, and it can suitably be used as the thermochromic pigment for writing instruments. As described later, when it is used as the pigment of the ink composition for writing instruments regardless of using a water-based solvent or an oil-based solvent, the effects described above can be exerted without being affected by the kind of the solvent.

<Ink Composition for Writing Instruments>

The ink composition for writing instruments according to the present invention is characterized by comprising the microcapsule pigment constituted in the manner described above, and the microcapsule pigment can be used as an ink composition for writing instruments such as water-based or oil-based ballpoint pens, and marking pens.

A content of the microcapsule pigment of the present invention is preferably 5 to 30% by mass (hereinafter referred to merely as %), more preferably 10 to 25% based on a total amount of the water-based or oil-based ink composition.

If the above content of the microcapsule pigment is less than 5%, the tinting power and the color developing property are unsatisfactory. On the other hand, if the content exceeds 30%, blurring is liable to be brought about. Accordingly, both are not preferred.

<Water-Based Ink Composition for Writing Instruments>

In the ink composition for writing instruments according to the present invention, water (tap water, refined water, distilled water, ion-exchanged water, purified water, and the like) as a solvent is contained therein as the balance as well as the microcapsule pigment described above in a case of the water-based ink composition, and in addition thereto, a water-soluble organic solvent, a thickener, a lubricant, a corrosion inhibitor, a preservative or a fungicide, and the like can suitably be contained therein according to uses for the respective writing instruments (ballpoint pens, marking pens and the like) as long as the effects of the present invention are not damaged.

Capable of being used alone or in a mixture as the water-soluble organic solvent which can be used are, for example, glycols such as ethylene glycol, diethylene glycol, triethylene glycol, propylene glycol, polyethylene glycol, 3-butylene glycol, thiodiethylene glycol, and glycerin, ethylene glycol monomethyl ether and diethylene glycol monomethyl ether.

The thickener which can be used is preferably at least one selected from the group consisting of, for example, synthetic polymers, celluloses and polysaccharides. The group includes, to be specific, gum arabic, tragacanth gum, guar gum, locust bean gum, alginic acid, carrageenan, gelatin, xanthan gum, welan gum, succinoglycan, diutan gum, dextran, methyl cellulose, ethyl cellulose, hydroxyethyl cellulose, carboxymethyl cellulose, carboxymethyl starch and salts thereof, propylene glycol alginate, polyvinyl alcohol, polyvinylpyrrolidone, polyvinyl methyl other, polyacrylic acid and salts thereof, carboxyvinyl polymers, polyethylene oxide, copolymers of vinyl acetate and polyvinylpyrrolidone, cross-linking type acrylic acid polymers and salts thereof, non-cross-linking type acrylic acid polymers and salts thereof, styrene acrylic acid copolymers and salts thereof, and the like.

The lubricant includes nonionic lubricants such as fatty acid esters of polyols, higher fatty acid esters of sugar, polyoxyalkylene higher fatty acid esters, and alkylphosphate esters, which are used as well for surface treating agents of pigments anionic lubricants such as alkylsulfonates of higher fatty acid amides, and alkylarylsulfonates, derivatives of polyalkylene glycols, fluorine base surfactants, polyether-modified silicones, and the like. The corrosion inhibitor includes benzotriazole, tolyltriazole, dicyclohexylammonium nitrite, suponins, and the like. The preservative or the fungicide includes phenol, omadine sodium, sodium benzoate, benzimodazole type compounds.

The above ink composition for writing instruments can be produced by using conventionally known methods, for example, by blending the prescribed amounts of the foregoing respective components used in the water-based ink composition described above in addition to the microcapsule pigment and stirring and mixing the components by means of a stirring device such as a homomixer, and a disperser. Further, coarse particles contained in the ink composition may be removed, if necessary, by filtering and/or centrifugal separation.

<Oil-Based Ink Composition for Writing Instruments>

The ink composition for writing instruments according to the present invention contains the microcapsule pigment constituted in the manner described above in a case of the oil-based ink composition, and the ink composition contains preferably at least one selected from polypropylene glycol, polybutylene glycol and polyoxypropylene diglyceryl ether as a main solvent. The above solvents which are selected and used as the main solvent act so that the microcapsule pigment described above is prevented from a time-dependent aggregation.

Polypropylene glycol and polybutylene glycol each having various polymerization degrees can be used. From the viewpoint of further exerting the effects of the present invention, polypropylene glycol having a polymerization degree (weight average) falling in a range of 400 to 700 is preferably used, and polybutylene glycol having a polymerization degree (weight average) falling in a range of 500 to 700 is preferably used.

Polyoxypropylene diglyceryl ether [POP (n) diglyceryl ether] used in the present invention is obtained by subjecting oxypropylene to addition polymerization with a hydroxyl group of diglycerin. In the present invention, an addition mole number (n) of oxypropylene in polyoxypropylene diglyceryl ether [POP (n) diglyceryl ether] is preferably 4 to 25, more preferably 4 to 14 from the viewpoint of further exerting the effects of the present invention.

A content of the above main solvents is preferably 50 to 100%, more preferably 80 to 100% based on a total amount of the solvents contained in the ink composition. Controlling a content of the above main solvents to 50% or more makes it possible to inhibit the microcapsule pigment to the utmost from being aggregated with a time-dependent aggregation. In addition to the main solvents described above, solvents, for example, glycerin, diglycerin, propylene glycol, and the like each having a property in which they are compatible with the main solvents can suitably be added as long as the effects of the present invention are not damaged.

The above ink composition for writing instruments can contain, in addition to the microcapsule pigment and the main solvent each described above, a resin, a dispersant, a corrosion inhibitor, a preservative, a lubricant, and the like which can be compatible with the water-based ink without exerting adverse effects thereon, according to uses for the respective writing instruments (ballpoint pens, marking pens and the like) or if necessary.

The resin which can be used includes, for example, resins represented by ketone resins, styrene resins, styrene-acrylate resins, terpene phenol resins, rosin-modified maleic acid resins, rosin phenol resins, alkylphenol resins, phenol type resins, styrene-maleic acid resins, rosin base resins, acrylate type resins, urea aldehyde type resins, maleic acid type resins, cyclohexanone type resins, polyvinyl butyral, polyvinylpyrrolidone, and the like.

The resins which can disperse the microcapsule pigment are selected from the resins listed above and can be used as the available dispersant. Surfactants and oligomers which meet the object can be used as well.

Capable of being listed as the specific dispersant are, for example, synthetic resins such as polyvinyl alcohol, polyvinylpyrrolidone, polyvinyl butyral, polyvinyl ether, styrene-maleic acid copolymers, ketone resins, hydroxyethyl cellulose and derivatives thereof, styrene-acrylic acid copolymers, PO.EO adducts, and amine base oligomers of polyesters.

Also, various kinds of the corrosion inhibitor, the preservatives and the lubricants each used in the water-based ink composition described above can be used as the corrosion inhibitor, the preservative and the lubricant.

The above ink composition for writing instruments can be produced by using methods which have so far been known, and the ink composition is obtained, for example, by blending the prescribed amounts of the foregoing respective components used in the oil-based ink composition described above in addition to the microcapsule pigment and stirring and mixing them by means of a stirring device such as a homomixer and a disperser. Further, coarse particles contained in the ink composition may be removed, if necessary, by filtering and centrifugal separation.

The ink composition for writing instruments according to the present invention is constituted in the manner described above, and prepared is the water-based or oil-based ink comprising the microcapsule pigment containing at least the colorant represented by Formula (I) which is excellent in a color intensity and a lightfastness, the developer and the chromic temperature controller. Thus, obtained is the ink composition for writing instruments which does not cause a time-dependent aggregation and chromism in the microcapsule pigment and which can change the color well handwritings when a writing instrument such as a ballpoint pen and a marking pen in which the above ink is loaded is used for writing on a paper and the like.

EXAMPLES

Next, the present invention shall be explained in further details with reference to examples and comparative examples, but the present invention shall not be restricted to the following examples. Hereinafter, "part" which is a blend unit means part by mass.

Production Example 1

Production of the Colorant Represented by Formula (I)

A mixture of diphenylamine 100 g (0.591 mol), resorcin 130.1 g (1.182 mol) and 85% phosphoric acid 6.9 g was heated at 200° C. for 6 hours under nitrogen atmosphere while stirring. After left cooling, the mixture was washed with hot water, and then the residue was treated by column chromatography to obtain 64.0 g of m-hydroxytriphenylamine.

Next, a mixture of m-hydroxytriphenylamine 42.3 g (0.162 mol), 4-methylphthalic anhydride 23 g (0.142 mol), anhydrous zinc chloride 15.8 g (0.116 mol) and chlorobenzene 110 g was heated at 100° C. for 5 hours while stirring. After left cooling, sodium hydroxide was added thereto, and the mixture was extracted with toluene. Toluene was removed from the extract under reduced pressure, and the residue was recystallized from acetone/methanol to obtain 21 g of methyl-3',6'-bisdiphenylaminofluoran.

Production Example 2

Production of the Colorant Represented by Formula (I)

In Production Example 1 described above, a mixture of diphenylamine 100 g (0.591 mol), resorcin 130.1 g (1.182 mol) and 85% phosphoric acid 6.9 g was heated at 200° C. for 6 hours under nitrogen atmosphere while stirring. After left cooling, the mixture was washed with hot water, and then the residue was treated by column chromatography to obtain 64.0 g of m-hydroxytriphenylamine.

Next, a mixture of m-hydroxytriphenylamine 42.3 g (0.162 mol), 4-chlorophthalic anhydride 26 g (0.142 mol), anhydrous zinc chloride 15.8 g (0.116 mol) and chlorobenzene 110 g was heated at 100° C. for 5 hours while stirring. After left cooling, sodium hydroxide was added thereto, and the mixture was extracted with toluene. Toluene was removed from the extract under reduced pressure, and the residue was recystallized from acetone/methanol to obtain 21 g of chloro-3',6'-bisdiphenylaminofluoran.

Production Example 3

Production of the Colorant Represented by Formula (I)

In Production Example 1 described above, a mixture of diphenylamine 100 g (0.591 mol), resorcin 130.1 g (1.182 mol) and 85% phosphoric acid 6.9 g was heated at 200° C. for 6 hours under nitrogen atmosphere while stirring. After left cooling, the mixture was washed with hot water, and then the residue was treated by column chromatography to obtain 64.0 g of m-hydroxytriphenylamine.

Next, a mixture of m-hydroxytriphenylamine 42.3 g (0.162 mol), 3,4-dichlorophthalic anhydride 31 g (0.142 mol), anhydrous zinc chloride 15.8 g (0.116 mol) and chlorobenzene 110 g was heated at 100° C. for 5 hours while stirring. After left cooling, sodium hydroxide was added thereto, and the mixture was extracted with toluene. Toluene was removed from the extract under reduced pressure, and the residue was recystallized from acetone/methanol to obtain 22 g of 3,4-dichloro-3',6'-bisdiphenylaminofluoran.

Microcapsule Pigments: Prescription of A-1 to A-7: (Microcapsule Pigments: A-1 to A-3)

The respective colorants 1 part (shown in the following Table 1) obtained as the leuco dye in Production Examples 1 to 3, 4,4'-(2-ethylhexylidene)bisphenol 2 parts as the developer and 4,4'-(hexafluoroisopropylidene)bisphenol dimyristate 24 parts as the chromic temperature controller were molten by heating at 100° C. to obtain a homogeneous composition 27 parts.

A homogeneous hot solution of the composition 27 parts obtained above was slowly added to 100 parts of an aqueous solution of 90° C. prepared as a protective colloid by dissolving 40 parts of a methylvinylether.maleic anhydride copolymer resin (Gantlet AN-179: manufactured by ISP Inc.) in water at pH 4 with NaOH, and the mixture was heated while stirring and dispersed in an oil droplet form having a diameter of about 0.5 to 1.0 μm. Then, a melamine resin (Sumitex Resin M-3, manufactured by Sumitomo Chemical Co., Ltd.) 20 parts as a capsule coating agent was slowly added thereto, and the mixture was heated at 90° C. for 30 minutes and microcapsulated to obtain a microcapsule dispersion of a reversible thermochromic composition in which a coating comprises the melamine resin. A hue thereof assumed a dense blue color in a developing state, and the microcapsule dispersion was completely colorless in an erasing state without the residual color.

Microcapsule Pigment: A-4:

The same prescription as that of A-1 described above was carried out to obtain a microcapsule dispersion of a reversible thermochromic composition, except that in the prescription of A-1, 4,4'-isopropylidenebisphenol dimyristate was used as the chromic temperature controller in place of 4,4'-(hexafluoroisopropylidene)bisphenol dimyristate. A hue thereof assumed a dense blue color in a developing state, and the microcapsule dispersion was completely colorless in an erasing state without the residual color.

Microcapsule Pigment: A-5:

The same prescription as that of A-2 described above was carried out to obtain a microcapsule dispersion of a reversible thermochromic composition, except that in the prescription of A-2, 4,4'-(1,3-dimethylbutylidene)bisphenol was used as the developer in place of 4,4'-(2-ethylhexylidene)bisphenol and that 4,4'-ethylidenebisphenol dilaurate was used as the chromic temperature controller in place of 4,4'-(isopropylidene)-bisphenol dimyristate. A hue thereof assumed a dense blue color in a developing state, and the microcapsule dispersion was completely colorless in an erasing state without the residual color.

Microcapsule Pigment: A-6:

The same prescription as that of A-3 described above was carried out to obtain a microcapsule dispersion of a reversible thermochromic composition, except that in the prescription of A-3, 4,4'-ethylidenebisphenol dilaurate was used as the chromic temperature controller in place of 4,4'-(hexafluoroisopropylidene)bisphenol dimyristate. A hue thereof assumed a dense blue color in a developing state, and the microcapsule dispersion was completely colorless in an erasing state without the residual color.

Microcapsule Pigment: A-7:

The same prescription as that of A-1 described above was carried out to obtain a microcapsule dispersion of a reversible thermochromic composition, except that in the prescription of A-1, 3-(4-diethylamino-2-ethoxyphenyl)-3-(1-ethyl-2-methylindole-3-yl)-4-azaphthalide was used as the leuco dye in place of methyl-3',6'-bisdiphenylaminofluoran. A hue thereof assumed a dense blue color in a developing state, and the microcapsule dispersion was completely colorless in an erasing state without the residual color.

Examples 1 to 10 and Comparative Examples 1 to 2

Prescription of Inks

The respective ink compositions for water-based and oil-based ballpoint pens were prepared by ordinary methods according to blend compositions shown in the following Table 2 (microcapsule pigments: A-1 to A-7; the respective components for the water-based inks in Examples 1 to 5 and Comparative Example 1, and the respective components for the oil-based inks in Examples 6 to 10 and Comparative Example 2). The respective microcapsule pigments A-1 to A-7 were obtained and used in the form of solid microcapsule pigments by filtering the respective microcapsule dispersions and drying the filtrates.

Preparation of Water-Based Ballpoint Pens and Oil-Based Ballpoint Pens:

The respective ink compositions obtained above were used to prepare water-based ballpoint pens and oil-based ballpoint pens. To be specific, a holder of a ballpoint pen (trade name: Signo UM-100, manufactured by Mitsubishi Pencil Co., Ltd.) was used, and the respective water-based and oil-based inks described above were filled in a refill comprising a polypropylene-made ink reservoir having an inner diameter of 3.8 mm and a length of 113 mm, a stainless steel-made tip (cemented carbide ball, ball diameter: 0.5 mm) and a joint for connecting the above reservoir and the above tip. An ink follower comprising a mineral oil as a main component was arranged at a rear end of the ink to prepare water-based ballpoint pens and oil-based ballpoint pens.

The respective ballpoint pens prepared in Examples 1 to 10 and Comparative Examples 1 to 2 were used to evaluate a lightfastness and a drawn line intensity by the following evaluating methods. The results thereof are shown in the following Table 2.

Evaluating Method of Lightfastness:

A concentration of the microcapsule pigment was controlled to 15% by mass by adding a melamine.formaldehyde condensation product to the dispersion of the microcapsule pigment described above. The dispersion thus obtained was coated on a peach Kent paper by means of an eccentric applicator (10MIL, manufactured by UESHIMA SEISAKUSHO Co., Ltd.) to develop a color thereof. The lightfastness was evaluated according to the following criteria. The above paper was irradiated with light for 30 and 50 hours by means of a xenon fade meter X25F (FLR40WS/M/36, manufactured by Suya Test, Instruments Co., Ltd.), and L values (brightness) thereof before and after irradiated were measured by means of a color computer (SC-P, manufactured by Suga Test Instruments Co., Ltd.) to evaluate the lightfastness with (the L value after irradiated)/(the L value before irradiated). The measurement was carried out on the condition of a light visual field of D65/10 excluding a regularly reflected light.

Evaluation Criteria:

◯: 1.0 to 1.1

Δ: more than 1.1 to less than 1.2 x: more than 1.2

Evaluating Method of Drawn Line Intensity:

The respective ballpoint pens were used to draw spirals on a writing paper conforming to an ISO standard with a free hand, and then the drawn line intensity was visually evaluated according to the following criteria.

Evaluation Criteria:

◯: color was developed in a deep blue color

Δ: color was developed at a little low intensity x: color was developed at a low intensity

TABLE 1

| | <Microcapsule pigment> | | | | | | | |
|---|---|---|---|---|---|---|---|---|
| | | | | | | | | (mass part) |
| | | A-1 | A-2 | A-3 | A-4 | A-5 | A-6 | A-7 |
| Dye | Methyl-3',6'-bisdiphenylaminofluoran | 1 | | | 1 | | | |
| | Chloro-3',6'-bisdiphenylaminofluoran | | 1 | | | 1 | | |
| | 3,4-Dichloro-3',6'-bisdiphenylaminofluoran | | | 1 | | | 1 | |
| | 3-(4-diethylamino-2-ethoxyphenyl)-3-(1-ethyl-2-methylindole-3-yl)-4-azaphthalide | | | | | | | 1 |
| Developer | 4,4'-(2-ethylhexylidene)bisphenol | 2 | 2 | 2 | 2 | | 2 | 2 |
| | 4,4'-(1,3-dimethyl-butylidene)bisphenol | | | | | 2 | | |
| Chromic Temperature controller | 4,4'-(hexafluoroisopropylidene)-bisphenol dimyristate | 24 | 24 | 24 | | | | 24 |
| | 4,4'-isopropylidenebisphenol dimyristate | | | | 24 | | | |
| | 4,4'-ethylidenebisphenol dilaurate | | | | | 24 | 24 | |

TABLE 2

| | | Examples | | | | | | | | | | Comparative Examples | |
|---|---|---|---|---|---|---|---|---|---|---|---|---|---|
| | | 1 | 2 | 3 | 4 | 5 | 6 | 7 | 8 | 9 | 10 | 1 | 2 |
| Microcapsule pigment | A-1 | 15 | | | | | 20 | | | | | | |
| | A-2 | | 15 | | | | | 20 | | | | | |
| | A-3 | | | 15 | | | | | 20 | | | | |
| | A-4 | | | | | | | | | | | | |
| | A-5 | | | | 15 | | | | | 20 | | | |
| | A-6 | | | | | 15 | | | | | 20 | | |
| | A-7 | | | | | | | | | | | 15 | 20 |
| Amines | Triethanolamine | 0.1 | 0.1 | 0.1 | 0.1 | 0.1 | | | | | | 0.1 | |
| Thickener | Xanthane gum *1 | 0.3 | 0.3 | 0.3 | 0.3 | 0.3 | | | | | | 0.3 | |
| Corrosion Inhibitor | Benzotriazole | 0.3 | 0.3 | 0.3 | 0.3 | 0.3 | | | | | | 0.3 | |
| Preservative | Benzisothiazoline and others *2 | 0.3 | 0.3 | 0.3 | 0.3 | 0.3 | | | | | | 0.3 | |
| Lubricant | Phosphate ester *3 | | | | | | 1 | 1 | 1 | 1 | 1 | | 1 |
| Solvent | Glycerin | 10 | 10 | 10 | 10 | 10 | | | | | | 10 | |
| | Polyoxypropylene (4) diglyceryl ether | | | | | | 79 | | 79 | | | | 79 |
| | Polyoxypropylene (14) diglyceryl ether | | | | | | | 79 | | | | | |
| | Polypropylene glycol polymerization degree: 400 | | | | | | | | | 79 | | | |
| | Polybutylene glycol polymerization degree: 500 | | | | | | | | | | 79 | | |
| Water | Refined water | 74 | 74 | 74 | 74 | 74 | | | | | | 74 | |
| Evaluation | Lightfastness (30 hours) | ○ | ○ | ○ | ○ | ○ | ○ | ○ | ○ | ○ | ○ | X | X |
| | Lightfastness (50 hours) | Δ | Δ | ○ | Δ | Δ | Δ | Δ | ○ | Δ | Δ | X | X |
| | Drawn line intensity | ○ | ○ | ○ | ○ | ○ | ○ | ○ | ○ | ○ | ○ | Δ | Δ |

*1: KELZAN S (manufactured by Sansho Co., Ltd.)
*2: Bioden 421 (manufactured by Daiwa Chemical Industries Co., Ltd.)
*3: RB-410 (manufactured by Toho Chemical Industry Co., Ltd.)

As apparent from the results shown in Table 1 and Table 2 each described above, it has become clear that the ink compositions for writing instruments prepared in Examples 1 to 10 falling in the scope of the present invention are excellent in a lightfastness and provides a satisfactory and sufficiently high drawn line intensity as compared with the ink compositions for writing instruments prepared in Comparative Examples 1 to 2 falling outside the scope of the present invention.

In contrast with the Examples, satisfactory and sufficiently high drawn line intensity and lightfastness are not obtained in the respective ink compositions containing the microcapsule pigments prepared by using 3-(4-diethylamino-2-ethoxyphenyl)-3-(1-ethyl-2-methylindole-3-yl)-4-azaphthalide as the leuco dye in Comparative Examples 1 to 2.

INDUSTRIAL APPLICABILITY

Obtained are dyes suitable for writing instruments such as water-based or oil-based ballpoint pens, marking pens, microcapsule pigments prepared by using the same, and ink compositions for writing instruments.

What is claimed is:

1. A blue colorant comprising a leuco dye represented by the following Formula (I):

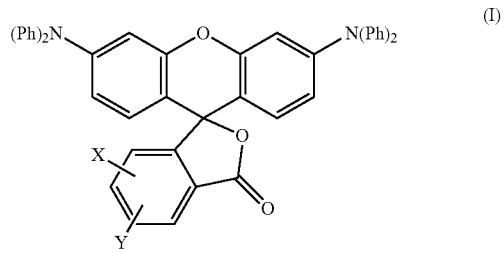

wherein X and Y represent a hydrogen atom, an alkyl group having 1 to 4 carbon atoms or a halogen atom; and X and Y may be identical or different from each other, provided that a case in which both of X and Y are a hydrogen atom is excluded.

2. The blue colorant as described in claim 1, wherein at least one of X and Y is a methyl group or a chlorine atom.

3. A microcapsule pigment comprising at least the blue colorant as described in claim 1, a developer and a chromic temperature controller.

4. A microcapsule pigment comprising at least the blue colorant as described in claim 2, a developer and a chromic temperature controller.

5. An ink composition for writing instruments comprising the microcapsule pigment as described in claim 3.

6. An ink composition for writing instruments comprising the microcapsule pigment as described in claim 4.

* * * * *